(12) United States Patent
Oishi et al.

(10) Patent No.: US 11,531,098 B2
(45) Date of Patent: Dec. 20, 2022

(54) RADAR IMAGE PROCESSING DEVICE AND RADAR IMAGE PROCESSING METHOD

(71) Applicant: MITSUBISHI ELECTRIC CORPORATION, Tokyo (JP)

(72) Inventors: Noboru Oishi, Tokyo (JP); Kazuhiko Yamamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 303 days.

(21) Appl. No.: 17/015,391

(22) Filed: Sep. 9, 2020

(65) Prior Publication Data

US 2020/0400813 A1 Dec. 24, 2020

Related U.S. Application Data

(63) Continuation of application No. PCT/JP2018/010002, filed on Mar. 14, 2018.

(51) Int. Cl.
*G01S 13/90* (2006.01)

(52) U.S. Cl.
CPC ...... *G01S 13/9029* (2013.01); *G01S 13/9027* (2019.05)

(58) Field of Classification Search
CPC ............ G01S 13/9011; G01S 13/9021; G01S 13/9027; G01S 13/9029
See application file for complete search history.

(56) References Cited

U.S. PATENT DOCUMENTS

| 2011/0169685 | A1* | 7/2011 | Nishiyama | G01S 7/046 342/179 |
| 2014/0340570 | A1 | 11/2014 | Meyers et al. | |
| 2016/0005154 | A1* | 1/2016 | Meyers | G06T 7/11 382/274 |
| 2016/0157828 | A1 | 6/2016 | Sumi et al. | |
| 2019/0129026 | A1 | 5/2019 | Sumi et al. | |
| 2021/0063565 | A1* | 3/2021 | Sharma | G01S 7/417 |

FOREIGN PATENT DOCUMENTS

| JP | 10-268041 A | 10/1998 |
| JP | 2005-326187 A | 11/2005 |
| JP | 2008-261720 A | 10/2008 |
| JP | 2014-95585 A | 5/2014 |
| JP | 2017-104476 A | 6/2017 |
| JP | WO 2019/130554 | * 12/2017 |

OTHER PUBLICATIONS

Chen et al., "Accurate Reconstruction and Suppression for Azimuth Ambiguities in Spaceborne Stripmap SAR Images", IEEE Geoscience and Remote Sensing Letters, Jan. 2017, vol. 14, No. 1, pp. 102-106.

(Continued)

*Primary Examiner* — Timothy X Pham
(74) *Attorney, Agent, or Firm* — Birch, Stewart, Kolasch & Birch, LLP (57) ABSTRACT

A radar image processing device performs determination of a pixel including a ghost image and changes the value of the pixel which is determined to include the ghost image on a radar image the focus of which has been changed.

13 Claims, 7 Drawing Sheets

(56) References Cited

OTHER PUBLICATIONS

Cumming et al., "Digital Processing of synthetic aperture radar data", Artech House, 2005, pp. 182, Total 3 pages.
International Search Report issued in PCT/JP2018/010002(PCT/ISA/210), dated May 15, 2018.
Japanese Office Action for Application No. 2018-535188 dated Aug. 7, 2018.
Canadian Office Action for Canadian Application No. 3,092,123 dated Feb. 2, 2021.
Extended European Search Report for European Application No. 18909775.1, dated Feb. 2, 2021.

* cited by examiner

RADAR IMAGE PROCESSING DEVICE AND RADAR IMAGE PROCESSING METHOD

CROSS REFERENCE TO RELATED APPLICATIONS

This application is a Continuation of PCT International Application No. PCT/JP2018/010002, filed on Mar. 14, 2018, which is hereby expressly incorporated by reference into the present application.

TECHNICAL FIELD

The present invention relates to a radar image processing device and a radar image processing method for suppressing a ghost image in a radar image.

BACKGROUND ART

In synthetic aperture radars (hereinafter referred to as SARs), a radar image related to an observation target area is obtained on the basis of a reception signal of a radio wave reflected at the observation target area. The radio wave is emitted to the observation target area from a moving object such as an aircraft, an artificial satellite, or a vehicle. The radar image has two axes: the range axis along a linear direction from the radar to the observation target area; and the azimuth axis along the traveling direction of the moving object or the direction orthogonal to the range axis. A pixel of the radar image has a complex number indicating a reflection wave from the observation target area.

When the radar image is Fourier-transformed in the direction of the azimuth axis and expressed by frequencies, elements in the axis of the Doppler frequency are obtained. Incidentally, signal processing for obtaining a radar image on the basis of a reception signal of a reflection wave from an observation target object is called "image reproduction." In image reproduction, a part of a radio wave irradiation area is set as an imaging area, and the process is performed while focusing so that this area forms an image. This imaging area is the observation target area.

It is also possible to change the focus of the radar image by performing signal processing on the radar image after image reproduction. In a case of monostatic observation, in a general imaging area, the Doppler frequency of a radio wave received by the radar is equal to or lower than the pulse repetition frequency (hereinafter referred to as PRF), and the time length from transmission to reception of the pulse is within a time range (range gate) required for analog-digital conversion of a reception signal of the reflection wave. Note that the PRF is determined depending on the cycle from transmission to reception of the pulse.

In many cases, SARs are designed so that the area of the main beam becomes the imaging area using the directivity of an antenna that transmits and receives a radio wave. However, although the antenna has directivity, radio waves are transmitted and received in almost all directions, and thus reflection waves from an object outside the imaging area are also received.

A reflection wave signal from an object outside the imaging area may overlap with a signal within the imaging area due to occurrence of aliasing when the Doppler frequency of the reflection wave signal exceeds the PRF. This is called azimuth ambiguity. Moreover, a signal from an object far from the imaging area or from an object closer to the radar than the imaging area as seen from the radar, cannot be distinguished from a signal, reception time of which is shifted by an integer multiple of the pulse repetition interval of the radar, and may overlap with a signal inside the imaging area. This is called a multi-order echo or range ambiguity. A ghost image caused by a reflection wave from an object outside the imaging area becomes blurred without forming the image even when the image is reproduced while focusing on the imaging area, and overlaps with a true image that is formed within the imaging area.

For example in the device described in Patent Literature 1, assuming a target in a radar image being ambiguity, and the position where the target is, the radar image is azimuth-compressed on the basis of the assumed position. In a case where the amplitude of the target in the azimuth-compressed image data is higher than a threshold value, the device determines that the target is ambiguity generated at the assumed position. The device determines whether the target is ambiguity by repeating the above process while changing the assumed position, and suppresses the ambiguity by replacing the amplitude value of the target determined as the ambiguity with 0 or with the average value amplitudes of pixels around the target.

CITATION LIST

Patent Literatures

Patent Literature 1: JP 2008-261720 A

SUMMARY OF INVENTION

Technical Problem

The device described in Patent Literature 1 suppresses a ghost image (ambiguity) included in a radar image focused on an observation target area, and thus the value of a pixel including the ghost image that is blurred and spread is replaced with 0 or with the average value of values of surrounding pixels.

Meanwhile, in a radar image in which an image of an object in the observation target area (hereinafter referred to as a true image) overlaps the ghost image and the focus is on the observation target area, the signal of the ghost image is blurred and spread, whereas the signal of the true image forms the image and is concentrated in a narrow area.

For this reason, the device described in Patent Literature 1 has a disadvantage that many of signals of the true image that overlaps with the ghost image are affected when the value of a pixel including the ghost image is changed, thereby suppressing the true image as well.

This invention solves the above disadvantages, and it is an object of the invention to obtain a radar image processing device and a radar image processing method capable of suppressing only ghost images in a radar image.

Solution to Problem

A radar image processing device according to the present invention includes a refocusing unit, a ghost image determination unit, and a ghost image suppression unit. The refocusing unit inputs thereto a radar image and changes the focus of the radar image. The ghost image determination unit determines a pixel including a ghost image from the radar image the focus of which has been changed by the refocusing unit. The ghost image suppression unit changes a value of the pixel that has been determined by the ghost image determination unit to include the ghost image on the radar image the focus of which has been changed by the refocusing unit, wherein the refocusing unit converts a signal of the radar image from a time domain to a Doppler frequency domain, and changes the focus of the radar image so that a phase correction amount of the signal in the Doppler frequency domain does not contain a component proportional in a Doppler frequency direction Advantageous Effects of Invention According to the present invention, a radar image processing device performs determination of a pixel including a ghost image and changes a value of the pixel which is determined to include the ghost image on a radar image the focus of which has been changed. As a result, the radar image processing device can suppress only ghost images in the radar image.

DESCRIPTION OF EMBODIMENTS

To describe the invention further in detail, embodiments for carrying out the invention will be described below with reference to the accompanying drawings.

First Embodiment

Figure 1:
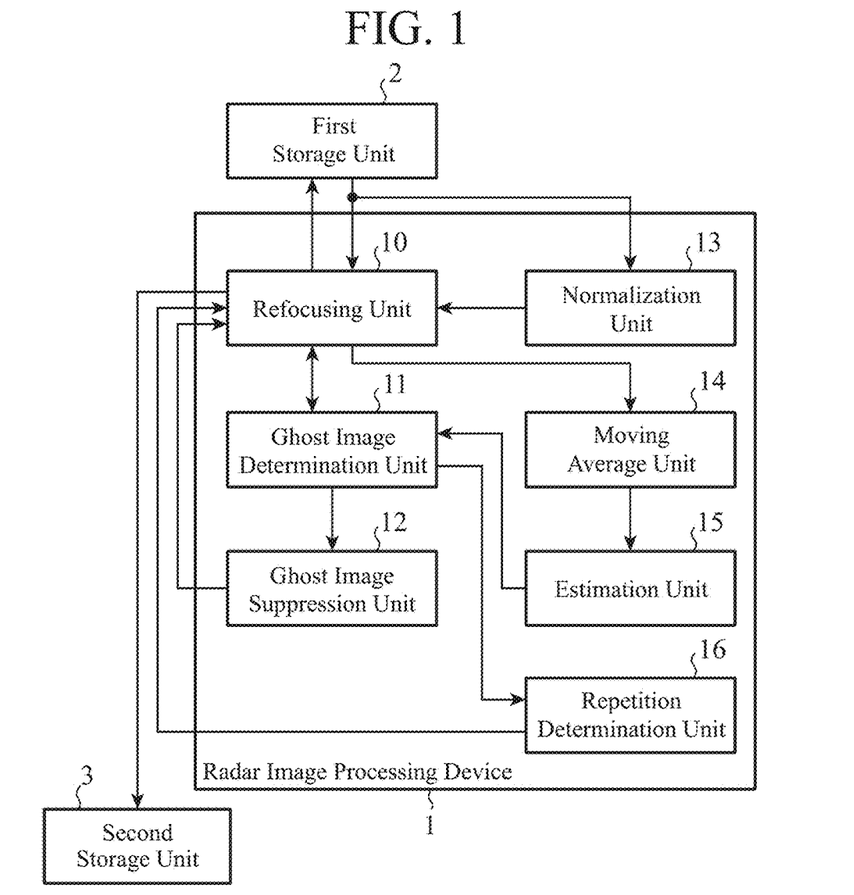
FIG. 1 is a block diagram illustrating a configuration of a radar image processing device according to a first embodiment of the invention.

FIG. 1 is a block diagram illustrating the configuration of a radar image processing device 1 according to a first embodiment of the invention. The radar image processing device 1 suppresses ghost images included in a radar image input from a first storage unit 2 and stores the radar image in which the ghost image is suppressed in a second storage unit 3. Note that the radar image is an image after image reproduction, and the focus can be changed by performing signal processing on the image. The original imaging area of the radar image is an observation target area; however, a radar image that forms an image outside the original imaging area can be obtained by changing the focus. In the example illustrated in FIG. 1, the radar image processing device 1 includes a refocusing unit 10, a ghost image determination unit 11, a ghost image suppression unit 12, a normalization unit 13, a moving average unit 14, an estimation unit 15, and a repetition determination unit 16.

The first storage unit 2 stores radar images. A radar (not illustrated) emits a radio wave toward an observation target area and receives the radio wave reflected at the observation target area. The radar generates a radar image of the observation target area on the basis of the reception signal of the radio wave.

Note that if a radio wave reflected at an object outside the observation target area is mixed with a radio wave reflected at the observation target area, a ghost image is generated in the radar image which is caused by the reflection wave from the object outside the observation target area.

The first storage unit 2 also stores the radar image in which the above-described ghost image is generated. The first storage unit 2 also stores a radar image the focus of which has been changed by the refocusing unit 10 or a radar image in which the blur of the ghost image to be processed by the ghost image suppression unit 12 is reduced.

The pixel value of a pixel of a radar image stored in the first storage unit 2 is a complex number.

The second storage unit 3 stores radar images in which a ghost image is suppressed by the radar image processing device 1 and the focus is on the original imaging area. Hereinafter, a radar image stored in the second storage unit 3 is referred to as a radar image with a suppressed ghost image.

The refocusing unit 10 inputs thereto a radar image from the first storage unit 2 and changes the focus of the radar image. For example, the refocusing unit 10 generates a radar image focused on outside the original imaging area by changing the focus of the radar image that is focused on the original imaging area. In the radar image focused on the original imaging area, this area forms an image, whereas a ghost image is blurred. Meanwhile, in a radar image focused on outside the original imaging area, an image formed in the original imaging area becomes blurred.

The ghost image determination unit 11 determines a pixel including a ghost image from the radar image the focus of which has been changed by the refocusing unit 10. The position information of the pixel determined to include the ghost image and the radar image are output from the ghost image determination unit 11 to the ghost image suppression unit 12. The position information of a pixel is, for example, position coordinates of the pixel on the radar image. The ghost image determination unit 11 determines whether there is a ghost image in the radar image on the basis of estimated values of the number of foldings input from the estimation unit 15. Details will be described later. The ghost image determination unit 11 further outputs the number of determinations of the pixel including the ghost image to the repetition determination unit 16.

The ghost image suppression unit 12 changes the value of the pixel that has been determined by the ghost image determination unit 11 to include the ghost image on the radar image the focus of which has been changed by the refocusing unit 10. For example, the ghost image suppression unit 12 replaces the value of the pixel including the ghost image with 0. As a result, the pixel including the ghost image is suppressed. However, as long as the pixel including the ghost image can be suppressed, the pixel value may be multiplied by a real number less than or equal to 1, or may be replaced with an average value of values of surrounding pixels. On the other hand, in a state where there is no pixel determined to include a ghost image, no change is made.

The normalization unit 13 normalizes the pixel amplitude in the radar image input from the first storage unit 2. For example, the normalization unit 13 replaces the pixel amplitude with a constant value A. The value A is a real number other than 0.

The moving average unit 14 inputs thereto the radar image the focus of which has been changed by the refocusing unit 10, and generates an image obtained by applying a moving average of pixels in the input radar image. For example, the moving average unit 14 subtracts, from each other, the phase of pixels separated by a certain distance (by $\delta_a$ pixels) in the azimuth direction among pixels included in the input radar image and generates a radar image obtained by applying a moving average of the values of the complex numbers of the pixels after the phase subtraction.

On the basis of the image generated by the moving average unit 14, the estimation unit 15 estimates the number of foldings that can reduce the blur of the ghost image. Note that the number of foldings includes the number of foldings indicating the degree of aliasing of azimuth ambiguity and a multiple of the pulse repetition interval of the radar that causes a shift in the reception time of range ambiguity. Hereinafter, it is assumed that a shift by an integer multiple of the pulse repetition interval of the radar at reception time is denoted by M, and the number of foldings that indicates the degree of aliasing is denoted by N.

The repetition determination unit 16 determines the end of repetition of a ghost image suppressing process by the ghost image suppression unit 12.

For example, the repetition determination unit 16 determines whether the number of repetitions input from the ghost image determination unit 11 has reached the upper limit value, and notifies the determination result to the refocusing unit 10. When receiving the determination result that the number of repetitions has reached the upper limit value, the refocusing unit 10 stores, in the second storage unit 3, the radar image focused on the original imaging area, in which the ghost image is suppressed (radar image with a suppressed ghost image).

Note that the radar image processing device 1 only needs to include the refocusing unit 10, the ghost image determination unit 11, and the ghost image suppression unit 12, and other components may be included in a separate device other than the radar image processing device 1. For example, the normalization unit 13, the moving average unit 14, the estimation unit 15, and the repetition determination unit 16 may be included in another device capable of exchanging information with the radar image processing device 1.

Next, the operation will be described.

Figure 2:
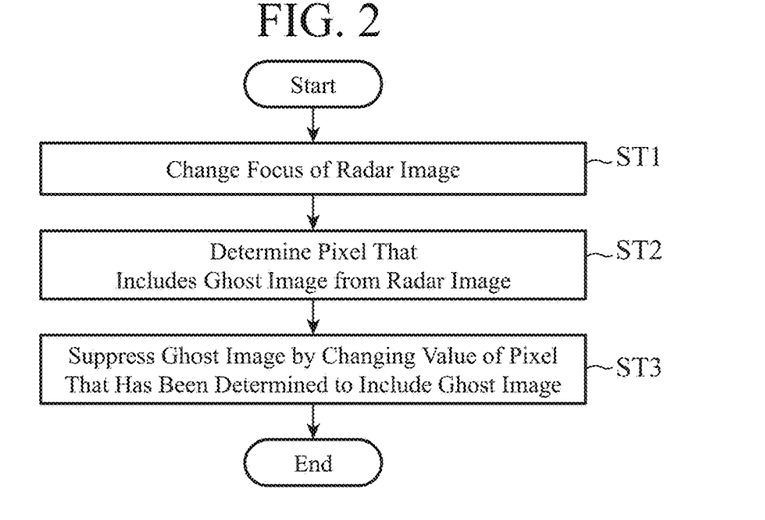
FIG. 2 is a flowchart illustrating a radar image processing method according to the first embodiment.

FIG. 2 is a flowchart illustrating a radar image processing method according to the first embodiment.

The refocusing unit 10 inputs thereto a radar image from the first storage unit 2 and changes the focus of the input radar image (step ST1). At this point, the refocusing unit 10 generates a radar image focused on outside the original imaging area by changing the focus of the radar image that is focused on the original imaging area.

Figure 3:
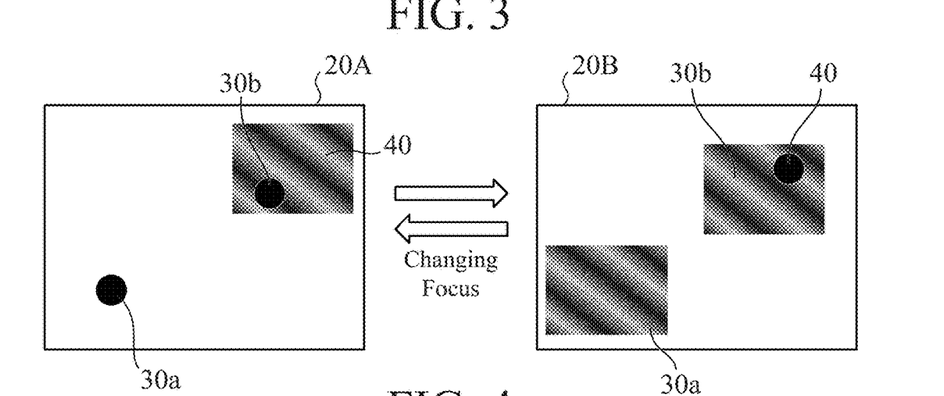
FIG. 3 is a diagram illustrating an outline of a focus change of a radar image in the first embodiment.

FIG. 3 is a diagram illustrating an outline of a focus change of a radar image. The radar image 20A illustrated in FIG. 3 is an image focused on the original imaging area. An image 30a and an image 30b are images of observation target objects, that is, true images. The true image 30b overlaps a ghost image 40. Since the radar image 20A is focused on the original imaging area, the image 30a and the image 30b are formed. For this reason, the signal of the image 30a and the signal of the image 30b are concentrated in narrow areas on the radar image 20A. Meanwhile, the ghost image 40 is blurred on the radar image 20A, and the signal of the ghost image 40 spreads over the area including the image 30b.

The refocusing unit 10 changes the radar image 20A focused on the original imaging area to a radar image 20B focused on outside the original imaging area. When the ghost image is in focus, the ghost image 40 is formed, and the signal of the ghost image 40 is concentrated in a narrow area. Meanwhile, the image 30a and the image 30b are blurred, and the signal of the image 30a and the signal of the image 30b spread over the radar image 20B.

Let us return to the description of FIG. 2.

The ghost image determination unit 11 determines a pixel including a ghost image from the radar image the focus of which has been changed by the refocusing unit 10 (step ST2).

For example, the ghost image determination unit 11 determines a pixel including the ghost image 40 formed in the narrow area on the radar image 20B illustrated in FIG. 3, and outputs the position information of the pixel determined to include the ghost image 40 and the radar image 20B to the ghost image suppression unit 12.

Next, the ghost image suppression unit 12 changes the value of the pixel that has been determined by the ghost image determination unit 11 to include the ghost image on the radar image the focus of which has been changed by the refocusing unit 10 (step ST3). For example, the ghost image suppression unit 12 specifies a pixel including the ghost image 40 on the radar image 20B on the basis of the position information of the pixel input from the ghost image determination unit 11, and changes the value of the specified pixel.

In the radar image 20B, as described above, signals of the ghost image 40 are concentrated in the narrow area, and the image 30a and the image 30b, which are true images, are blurred and spread. In this manner, even when the values of the pixels including the ghost image 40 concentrated in the narrow area are changed, most of the signals of the image 30b overlapping the ghost image 40 are not affected, and only the ghost image 40 is suppressed.

Next, details of a radar image processing method according to the first embodiment will be described.

Figure 4:
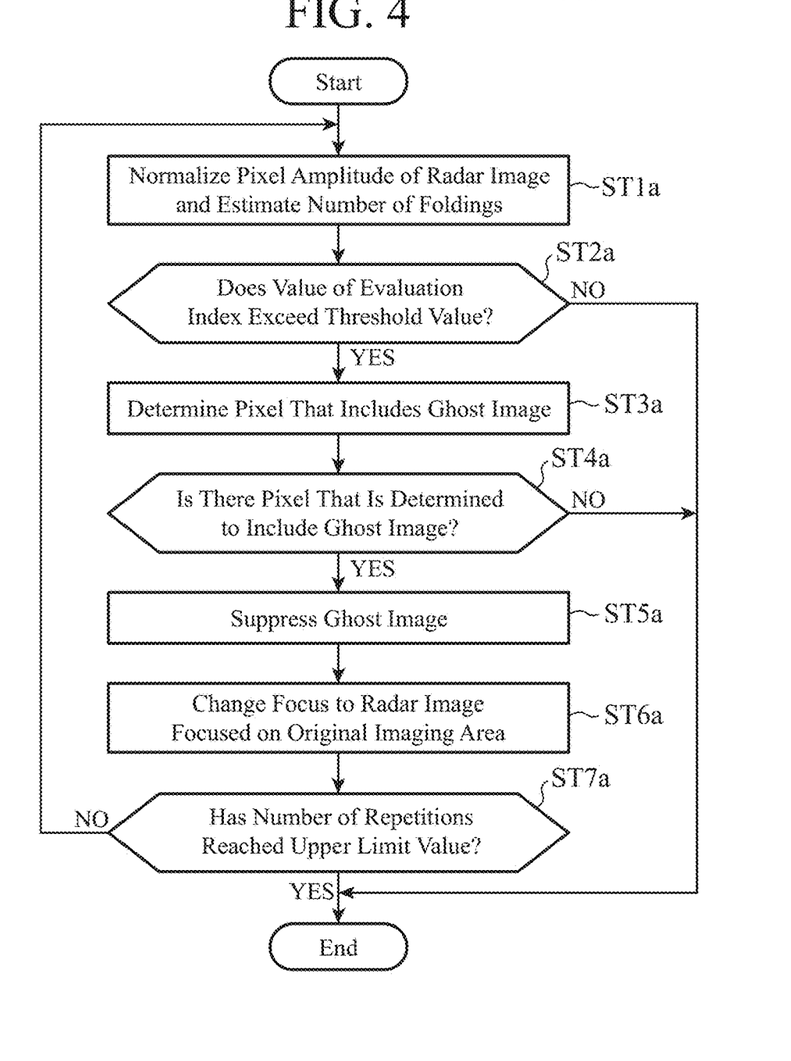
FIG. 4 is a flowchart illustrating details of a radar image processing method according to the first embodiment.

FIG. 4 is a flowchart illustrating details of a radar image processing method according to the first embodiment. In FIG. 4, processes from step ST1a to step ST2a are the details of the process of step ST1 in FIG. 2, and processes from step ST3a to step ST4a illustrate the details of the process of step ST2 in FIG. 2. Processes from step ST5a to step ST7a illustrates the details of the process of step ST3 in FIG. 2.

In step ST1a, the normalization unit 13 normalizes the pixel amplitude in the radar image input from the first storage unit 2, and the estimation unit 15 obtains estimated values $M_0$ and $N_0$ of the number of foldings that reduces the blur of the ghost image on the basis of the image generated by the moving average unit 14.

Figure 5:
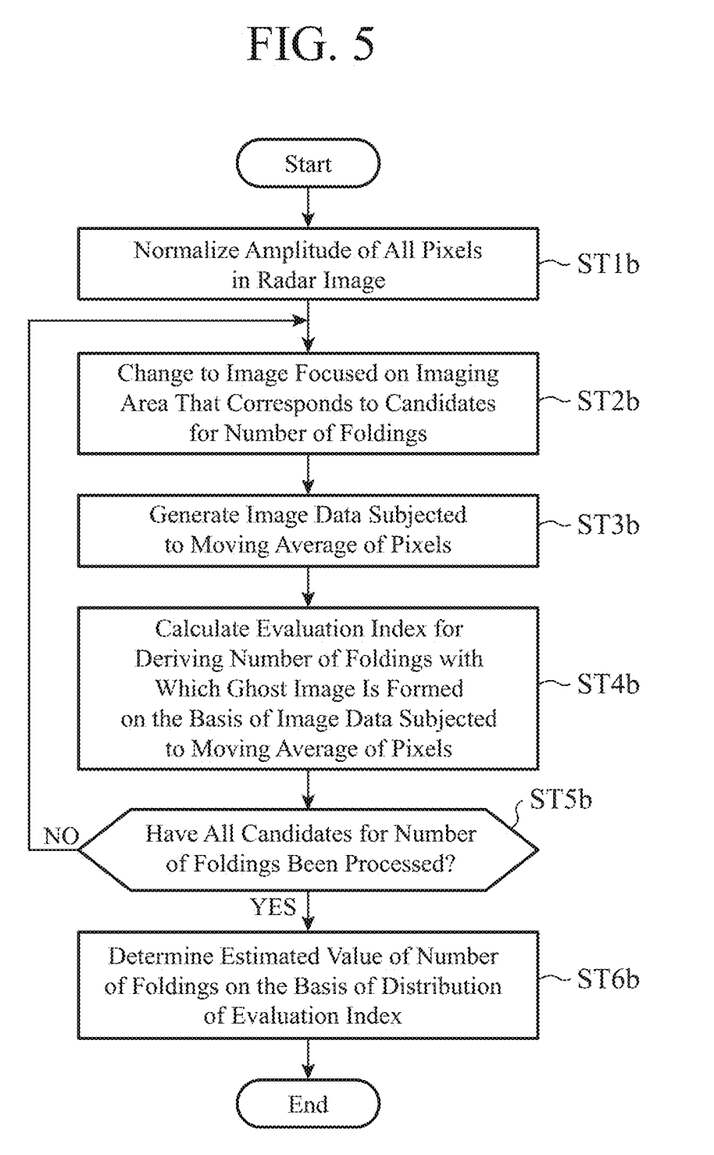
FIG. 5 is a flowchart illustrating normalization of the pixel amplitude and an estimation process of the number of foldings in the first embodiment.

FIG. 5 is a flowchart illustrating normalization of the pixel amplitude and an estimation process of the number of foldings in the first embodiment, and illustrates the details of the process in step ST1a in FIG. 4.

The normalization unit 13 normalizes the amplitudes of all pixels on the radar image to a constant value A (step ST1b). The value A is a real number other than 0. The normalization changes the amplitude distribution of pixels on the radar image, but does not change the phase distribution of the pixels. After changing the focus of the radar image by this process so that the blur of the ghost image is reduced, it becomes possible to perform an accurate evaluation that is not affected by the amplitude distribution of pixels on the radar image when the degree of formation of the ghost image is evaluated.

The refocusing unit 10 changes the radar image, the pixel amplitude of which is normalized by the normalization unit 13 and is focused on the original imaging area, to an image focused on the imaging area that corresponds to candidates for the number of foldings M and N (step ST2*b*). The candidates for the number of foldings M and N are obtained by the estimation unit 15 and are set in the refocusing unit 10 by the ghost image determination unit 11.

Since there is no folding of a signal of the ghost image when M=0 and N=0 holds, a radar image focused on an imaging area that corresponds to M=0 and N=0 is the one that is focused on the original imaging area. The refocusing unit 10 sequentially generates images focused on an imaging area that corresponds to M and N by changing the values of the candidates for the number of foldings M and N that are set by the ghost image determination unit 11. Here, both the values of M and N may be changed. Alternatively, for example, the value of M may be fixed at 0 while only the value of N is changed, or the value of N may be fixed at 0 while only the value of M is changed.

In a radar image focused on the imaging area that corresponds to the candidates for the number of foldings M and N, as illustrated in FIG. 3, the blur of a ghost image is reduced and the signal of the ghost image that has been blurred and spread becomes concentrated in a narrow area. Note that the refocusing unit 10 is only required to change to a focus at which the blur of the ghost image is reduced, and it is not necessary to make a point response of an ideal radar image in which the blur is completely eliminated.

In addition, the image formed in the radar image focused on the original imaging area is blurred and spread due to the focus change.

The refocusing unit 10 Fourier-transforms in the azimuth direction the radar image the pixel amplitude of which is normalized by the normalization unit 13 and converts to a signal in a range Doppler frequency domain.

The distance $R_t(R_0, f_\eta)$ between an observation target within the original imaging area and the radar when the moving object on which the radar is mounted is subjected to a constant velocity linear motion at a velocity of $V_r$ can be derived from the following equation (1) as described in the following Reference Literature. Note that $R_0$ is the distance when the radar and an object that reflects the radio wave are closest to each other. Symbol $\lambda$ denotes the wavelength of the radio wave, and $f_\eta$ denotes the Doppler frequency of the signal of the radio wave.

$$R_t(R_0, f_\eta) = R_0 / \{1 - \lambda^2 f_\eta^2 / (4V_r^2)\}^{1/2} \quad (1)$$

(Reference Literature) I. G. Cumming, F. H. Wong, "Digital processing of synthetic aperture radar", Artech House, 2005.

The distance $R_a(R_0, f_\eta, M, N)$ between an object outside the original imaging area and the radar can be derived from the following equation (2), where M and N are candidates for the number of foldings. Here, c is the speed of light, and $f_{PRF}$ is the pulse repetition frequency (PRF) of radio wave in the radar. Symbol $\theta_N$ is a value obtained from the following equation (3).

$$R_a(R_0, f_\eta, M, N) = \{R_0 + cM/(2f_{PRF})\}\cos(\theta_N)/\{1 - \lambda^2 f_\eta^2 / (4V_r^2)\}^{1/2} \quad (2)$$

$$\theta_N = \sin^{-1}\{\lambda N f_{PRF}/(2V_r)\} \quad (3)$$

The radar image focused on the original imaging area is corrected on the basis of the distance change and the phase change depending on $R_t(R_0, f_\eta)$. Meanwhile, the radar image focused on outside the original imaging area needs to be corrected on the basis of the distance change and the phase change depending on $R_a(R_0, f_\eta, N, M) - R_t(R_0, f_\eta)$. The focus outside the original imaging area can be obtained by calculating $R_a(R_0, f_\eta, N, M) - R_t(R_0, f_\eta)$ assuming the candidates for the number of foldings M and N and correcting the calculated distance and phase.

For the radar image focused on the original imaging area, $R_t(R_0, f_\eta) = R_a(R_0, f_\eta, 0, 0)$ holds since M=0 and N=0. For this reason, the focus changing process by the refocusing unit 10 can be considered as a process to change the focus from a radar image focused on an imaging area that corresponds to candidates for the number of foldings M' and N' to a radar image focused on an imaging area that corresponds to candidates for the number of foldings M and N.

In the focus changing process by the refocusing unit 10, a correction amount $\Delta R(R_0, f_\eta, N, M, N', M')$ of the distance between the radar and an object outside the original imaging area satisfies the relationship of the following equation (4).

$$\Delta R(R_0, f_\eta, N, M, N', M') = R_a(R_0, f_\eta, N, M) - R_a(R_0, f_\eta, N', M') \quad (4)$$

In the above-described correction of distance, a Fourier-transformed signal of a radar image is shifted by each Doppler frequency $f_\eta$ depending on the correction amount $\Delta R(R_0, f_\eta, N, M, N', M')$.

The method of shifting may be interpolation. Alternatively, the radar image may be Fourier-transformed in the range direction, and then multiplied by a linear phase that corresponds to the correction amount $\Delta R(R_0, f_\eta, N, M, N', M')$ and then inverse-Fourier-transformed in the range direction.

In the focus changing process, the phase is corrected by the following procedure.

The refocusing unit 10 fits the correction amount $\Delta R(R_0, f_\eta, N, M, N', M')$ with a linear function of the Doppler frequency $f_\eta$ for each $R_0$. When the fitted linear function is given by $f(R_0, f_\eta, N, M, N', M')$, the phase correction amount $\varphi(R_0, f_\eta, N, M, N', M')$ can be derived from the following equation (5).

$$\varphi(R_0, f_\eta, N, M, N', M') = (4\pi/\lambda)\{\Delta R(R_0, f_\eta, N, M, N', M') - f(R_0, f_\eta, N, M, N', M')\} \quad (5)$$

If the phase correction amount $\varphi(R_0, f_\eta, N, M, N', M')$ includes the phase $f(R_0, f_\eta, N, M, N', M')$ proportional to the Doppler frequency $f_\eta$, an image subjected to inverse Fourier transform after correction of the phase is shifted in the travelling direction (azimuth direction) of the moving object. In order to prevent this shift, linear phase components are removed from the phase correction amount $\varphi(R_0, f_\eta, N, M, N', M')$. By multiplying a signal in the range Doppler frequency domain by exp $[-j\varphi(R_0, f_\eta, N, M, N', M')]$, the phase of the signal is corrected. As described above, the refocusing unit 10 changes the focus of the radar image so that the phase correction amount $\varphi(R_0, f_\eta, N, M, N', M')$ for the signal in the Doppler frequency domain obtained by performing the Fourier transform on the radar image in the azimuth direction does not contain the phase component proportional in the Doppler frequency direction.

The refocusing unit 10 performs the inverse Fourier transform in the range direction on the signal with corrected distance and phase, and thereby obtains a radar image that is formed in the imaging area that corresponds to the candidates for the number of foldings M and N. Note that the focus changing process described above is merely an example, and the focus may be changed by autofocus. In the focus changing process, when the value of the phase correction amount $\varphi$ ($R_0$, $f_\eta$, N, M, N', N') is small, the phase correction process may be omitted. The distance $R_t$ ($R_0$, $f_\eta$) may be calculated by another equation other than the above equation (1).

Note that for the radar image focused on the original imaging area in the focus changing process, M=0 and N=0 hold for candidates for the number of foldings M'≠0 and N'≠0. For the radar image focused on outside the original imaging area, M≠0 and N≠0 hold for candidates for the number of foldings M'=0 and N'=0.

The moving average unit 14 inputs the radar image in which the pixel amplitude has been normalized by the normalization unit 13 and the focus thereof has been changed by the refocusing unit 10 in the above-described procedure, and generates an image obtained by applying a moving average of pixels of the input radar image (step ST3b). This moving average removes noise from the radar image the focus of which has been changed.

First, before calculating the moving average, the moving average unit 14 subtracts the phase of a pixel separated by $\delta_a$ pixels in the azimuth direction from the phase of each pixel of the radar image the focus of which has been changed by the refocusing unit 10. The value $\delta_a$ is a real number other than 0. This process corresponds to taking differential of the pixel phase on the radar image in the azimuth direction. The moving average unit 14 generates a radar image obtained by applying a moving average of pixels differentiated in the azimuth direction.

In the radar image, the focus of which has been changed, there is a primary component of a phase that corresponds to the position of that object causing the ghost image, that is, a component proportional in the azimuth direction. Noise is removed from the radar image by removing the primary component by phase differentiation and calculating the moving average of the pixels. In this moving average, the average of signals scattered on the complex plane is likely to be zero compared to an image obtained by applying moving averaging of only the pixel amplitude, and thus the noise reduction effect is high. Furthermore, by applying the moving average of pixels, the influence of interference among signals, speckles, and numerical calculation errors in signal processing is reduced in addition to the noise included in the radar image.

Next, the estimation unit 15 calculates an evaluation index for obtaining the number of foldings at which a ghost image is formed on the basis of the radar image in which the moving average of pixels is applied by the moving average unit 14 (step ST4b). Here, the estimation unit 15 sequentially inputs, for each pair of candidates for the number of foldings M and N, a radar image the focus of which is changed by the refocusing unit 10 to be suitable for the imaging area that corresponds to the candidates for the number of foldings M and N and to which a moving average has been applied by the moving average unit 14, to obtain an evaluation index. For example, the estimation unit 15 extracts L pixels having a large amplitude from the input radar image, and uses the average value of amplitudes of the extracted pixels as an evaluation index. Note that the evaluation index may be the maximum value of the amplitudes among the L pixels, or may be an average value of the amplitudes of all the pixels in the radar image.

The estimation unit 15 determines the candidates for the number of foldings M and N that maximizes the value of the evaluation index.

Figure 6:
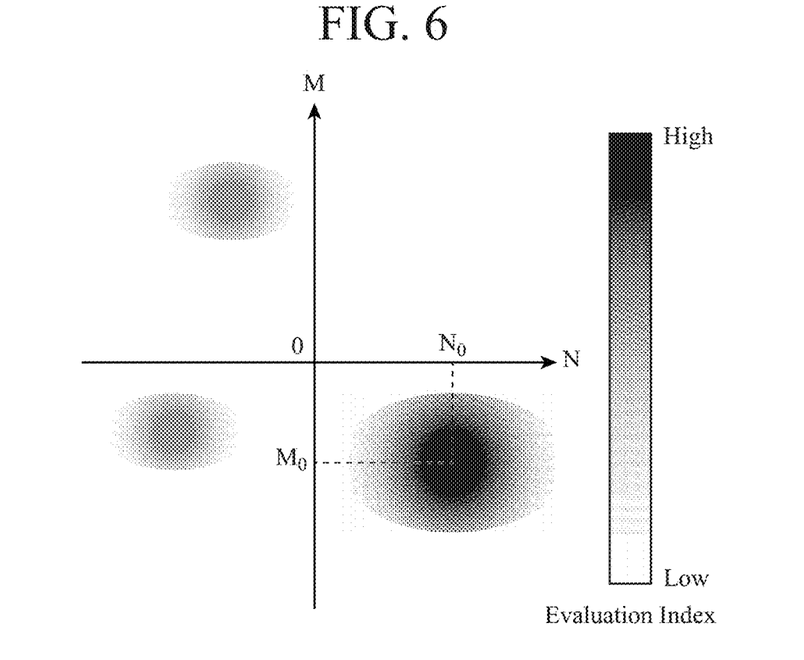
FIG. 6 is a diagram illustrating the relationship between an evaluation index and the number of foldings.

FIG. 6 is a diagram illustrating the relationship between an evaluation index and the number of foldings, illustrating the distribution of the evaluation index obtained by calculating the evaluation index while changing the values of the candidates for the number of foldings M and N. In the pictured diagram of the distribution of the evaluation index, a white part indicates that the value of the evaluation index is low, and a black part indicates that the value of the evaluation index is high.

When having calculated the evaluation index on the basis of the image focused on the imaging area that corresponds to the candidates for the number of foldings M and N, the estimation unit 15 confirms whether the calculation process of the evaluation index has been performed for all the candidates for the number of foldings (step ST5b). If the calculation process of the evaluation index has not been performed for all the candidates for the number of foldings (step ST5b: NO), the estimation unit 15 returns to step ST2b and repeats the above process. In this manner, the distribution of the evaluation index illustrated in FIG. 6 is generated sequentially. To the contrary, if the calculation process of the evaluation index has been performed for all the candidates for the number of foldings (step ST5b: YES), the estimation unit 15 sets the candidates for the number of foldings M and N that maximize the value of the evaluation index from the distribution of the evaluation index as estimated values $M_0$ and $N_0$ of the number of foldings (step ST6b).

Let us return to the description of FIG. 4.

In step ST2a, the ghost image determination unit 11 determines whether the value of the evaluation index, where estimated values of the number of foldings input from the estimation unit 15 are $M_0$ and $N_0$, exceeds a threshold value $T_1$.

The threshold value $T_1$ is set in advance in the ghost image determination unit 11 as a threshold value parameter for the evaluation index. If the value of the evaluation index, where the estimated values of the number of foldings are $M_0$ and $N_0$, is equal to or less than the threshold value $T_1$ (step ST2a: NO), there is no ghost image in the target radar image, and thus the process in FIG. 4 is terminated. In this manner, when the evaluation index is equal to or less than the threshold value $T_1$ that is separately defined as a parameter, the repetition is stopped and the process ends.

When an image the pixel amplitude value of which is normalized to A is changed to have a focus suitable for the imaging area that corresponds to the estimated values $M_0$ and $N_0$ of the number of foldings, the value of the pixel amplitude in the image changed to have this focus becomes at least larger than A.

Moreover, L pixels having a large amplitude are extracted from the pixels in the image the focus of which has been changed, and an average value of amplitudes of the extracted pixels is used as the evaluation index. Since this evaluation index is calculated on the basis of the image the focus of which is changed, in a case where there is a ghost image formed on the image the focus of which is changed, the value of the evaluation index calculated from this image is larger than A. To the contrary, in a case where ghost images are suppressed or there is no ghost image in the image the focus of which is changed, the value of the evaluation index is smaller than A. As described above, the radar image processing device 1 according to the first embodiment is capable of determining whether there is a ghost image in an image on the basis of an evaluation index.

If the value of the evaluation index, where the estimated values of the number of foldings are $M_0$ and $N_0$, exceeds the threshold value $T_1$ (step ST2a: YES), the ghost image determination unit 11 specifies the estimated values of the number of foldings $M_0$ and $N_0$ as the information related to a focus that forms a ghost image or a focus that reduces the blur of a ghost image.

The ghost image determination unit 11 outputs the estimated values of the number of foldings $M_0$ and $N_0$ to the refocusing unit 10. The refocusing unit 10 changes the focus of the radar image input from the first storage unit 2 to a focus that forms an image within the imaging area that corresponds to the estimated values of the number of foldings $M_0$ and $N_0$, and outputs the radar image with the changed focus to the ghost image determination unit 11.

The ghost image determination unit 11 determines a pixel including a ghost image formed on the radar image input from the refocusing unit 10 (step ST3a).

For example, the ghost image determination unit 11 determines that a pixel that satisfies all of the following four conditions include a ghost image. Note that the determination based on the following four conditions is performed for each pixel. A pixel existing at coordinates (x, y) on the radar image formed in the imaging area that corresponds to the candidates for the number of foldings M and N is denoted by S (x, y, N, M).

A first condition is that the maximum value of the pixel amplitude in a case where the coordinates (x, y) are fixed while the candidates for the number of foldings M and N are changed matches the pixel amplitude in a case where the estimated values of the number of foldings are $M_0$ and $N_0$. That is, the first condition is that a pixel S (x, y, N, M) satisfies the following equation (6). Note that $\max_{N,M}[\ ]$ indicates that the maximum value in [ ] is extracted when the values of M and N are changed.

$$\max_{N,M}[|S(x,y,N,M)|]=|S(x,y,N_0,M_0)| \quad (6)$$

A second condition is that the pixel amplitude reaches a peak where the estimated values of the number of foldings are $M_0$ and $N_0$. That is, the second condition is for the pixel to satisfy all of the following equations (7), (8), (9), and (10).

$$\max_N[|S(x,y,N,M)|-|S(x,y,N-1,M)|]=|S(x,y,N_0,M_0)|-|S(x,y,N_0-1,M_0)| \quad (7)$$

$$\min_N[|S(x,y,N,M)|-|S(x,y,N-1,M)|]=|S(x,y,N_0,M_0)|-|S(x,y,N_0+1,M_0)| \quad (8)$$

$$\max_M[|S(x,y,N,M)|-|S(x,y,N,M-1)|]=|S(x,y,N_0,M_0)|-|S(x,y,N_0,M_0-1)| \quad (9)$$

$$\min_M[|S(x,y,N,M)|-|S(x,y,N,M+1)|]=|S(x,y,N_0,M_0)|-|S(x,y,N_0,M_0+1)| \quad (10)$$

A third condition is that the autocorrelation coefficient of the pixel, where the estimated values of the number of foldings are $M_0$ and $N_0$, is lower than a threshold value $T_2$. The threshold value $T_2$ is set in advance in the ghost image determination unit 11 as a threshold value parameter for the autocorrelation coefficient. The autocorrelation coefficient C (x, y, $N_0$, $M_0$) is calculated from the following equation (11). In the following equation (11), a shift amount $\delta_x$ and a shift amount $\delta_y$ are parameters set in advance in the ghost image determination unit 11. Symbol W represents an area for which the autocorrelation coefficient is calculated, and * indicates a complex conjugate. The following equation (11) is for calculation of the value of the autocorrelation coefficient from the pixel S (x, y, N, M), and the value of the autocorrelation coefficient may be calculated from the pixel amplitude |S(x, y, N, M)|, or may be calculated from pixel values applied with a moving average by the moving average unit 14.

$$C(x,y,N_0,M_0)=|\Sigma_{(x,y)\in W}S(x+\delta_x,y+\delta_y,N_0,M_0)S^*(x,y,N_0,M_0)|/\{\Sigma_{(x,y)\in W}|S(x,y,N_0,M_0)|^2\Sigma_{(x,y)\in W}|S(x+\delta_x,y+\delta_y,N_0,M_0)|^2\}^{1/2} \quad (11)$$

A fourth condition is that the pixel amplitude on an image S' (x, y), in which the pixel amplitude is normalized, the focus is changed to a focus suitable for the imaging area that corresponds to the candidates for the number of foldings M and N, and the pixel phase is applied with the moving average, is higher than a threshold value $T_3$. The threshold value $T_3$ is set in advance in the ghost image determination unit 11 as a threshold value parameter related to the pixel amplitude on the image S' (x, y).

Note that the image S' (x, y) is output from the estimation unit 15 to the ghost image determination unit 11.

In the image S' (x, y), the pixel amplitude is normalized to A by the normalization unit 13, and the focus is changed by the refocusing unit 10, and the signal power of the ghost image is concentrated. For this reason, the value of the amplitude |S' (x, y)| of the pixel forming an image in the image S' (x, y) is at least larger than A. The fourth condition is that the following equation (12) is satisfied.

$$|S'(x,y)| \geq T_3 \quad (12)$$

The ghost image determination unit 11 determines for each pixel whether all of the first to fourth conditions are satisfied, and determines a pixel that satisfies the four conditions as a pixel that includes a formed ghost image.

The ghost image determination unit 11 may also determine a pixel having a signal power of a ghost image or the pixel amplitude larger than a threshold value as a pixel that includes a formed ghost image, for the radar image that has been changed to an image focused on the imaging area that corresponds to the estimated values $M_0$ and $N_0$ of the number of foldings.

The ghost image determination unit 11 may further perform a constant false alarm rate (hereinafter referred to as CFAR) process on the radar image that has been changed to an image focused on the imaging area that corresponds to the estimated values $M_0$ and $N_0$ of the number of foldings. In this case, the ghost image determination unit 11 performs the CFAR process on the radar image to detect a pixel the power or amplitude of which is larger than those of surrounding pixels and is at the top of a peak, and determines the detected pixel as a pixel including a formed ghost image.

The ghost image determination unit 11 determines whether there is a pixel including a ghost image on the radar image (step ST4a). If the ghost image determination unit 11 determines that there is no pixel including a ghost image (step ST4a: NO), the process of FIG. 4 is terminated. In this manner, in a case where there is no pixel including a ghost image, the repetition is stopped and the process ends.

On the other hand, if it is determined that there is a pixel including a ghost image (step ST4a: YES), the ghost image determination unit 11 outputs position information of the pixel including the ghost image to the ghost image suppression unit 12.

The ghost image suppression unit 12 suppresses the ghost image on the basis of the position information of the pixel including the ghost image (step ST5a). The radar image to be suppressed of the ghost image is a radar image which is read from the first storage unit 2 by the refocusing unit 10, and is changed to be focused on the imaging area that corresponds to the estimated values $M_0$ and $N_0$ of the number of foldings. The ghost image suppression unit 12 suppresses the ghost image by replacing the value of the pixel determined to include the ghost image with 0. Note that the ghost image suppression unit 12 may multiply the value of the pixel determined to include a ghost image by a real number equal to or less than 1, may replace the value of each pixel determined to include a ghost image with the average value of values of surrounding pixels. The image the ghost image of which is suppressed by the ghost image suppression unit 12 is output to the refocusing unit 10.

The refocusing unit 10 changes the focus of the radar image the ghost image of which is suppressed by the ghost image suppression unit 12 to a focus suitable for the original imaging area (step ST6a).

Note that the number of times of the determination process by the ghost image determination unit 11 corresponds to the number of repetitions of the ghost image suppression process by the ghost image suppression unit 12.

The repetition determination unit 16 inputs the number of times of determination from the ghost image determination unit 11, and determines whether the number of repetitions, which is the input number of times of determination, has reached an upper limit value $T_4$ (step ST7a).

If the number of repetitions has reached the upper limit value $T_4$ (step ST7a: YES), the process of FIG. 4 is terminated. In this manner, when the number of repetitions of the process reaches the upper limit value of the number of repetitions that is specified as a separate parameter, the repetition is stopped and the process ends. At this point, the repetition determination unit 16 notifies the refocusing unit 10 that the number of repetitions has reached the upper limit value $T_4$. When receiving the above notification from the repetition determination unit 16, the refocusing unit 10 returns the focus of the radar image with the suppressed ghost image to the original imaging area and stores in the second storage unit 3.

If the number of repetitions has not reached the upper limit value $T_4$ (step ST7a: NO), the repetition determination unit 16 notifies the refocusing unit 10 that the number of repetitions has not reached the upper limit value $T_4$.

When receiving the above notification from the repetition determination unit 16, the refocusing unit 10 stores, in the first storage unit 2, the radar image in which the ghost image is suppressed and is focused on the original imaging area.

As a result, the series of processes from step ST1a is repeated for the image stored in the first storage unit 2.

Although it has been described that the repetition determination unit 16 determines the number of repetitions of the ghost image suppression process, the repetition determination unit 16 may determine the number of times of the determination process by the ghost image determination unit 11. Moreover, the repetition determination unit 16 may store the radar image with a suppressed ghost image in the first storage unit 2 or the second storage unit 3. For example, in a case where the number of repetitions has not reached the upper limit value $T_4$, the repetition determination unit 16 inputs a radar image from the refocusing unit 10 and stores the input radar image in the first storage unit 2. Alternatively, in a case where the number of repetitions has reached the upper limit value $T_4$, the repetition determination unit 16 inputs the radar image with the suppressed ghost image from the refocusing unit 10, and stores the input radar image in the second storage unit 3.

Figure 7:
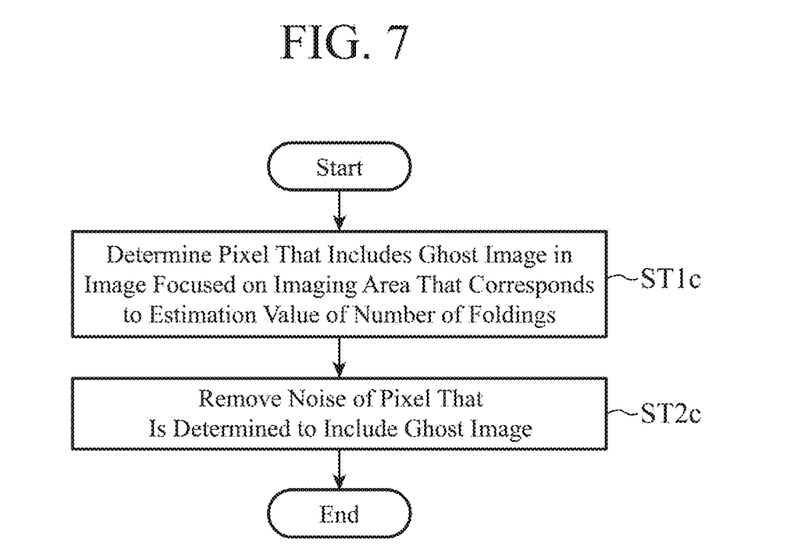
FIG. 7 is a flowchart illustrating a ghost image determining process in the first embodiment.

FIG. 7 is a flowchart illustrating a ghost image determining process in the first embodiment and details of the process in step ST3a in FIG. 4. Before the process of FIG. 7 is executed, in step ST1a, the estimation unit 15 has generated the distribution of the evaluation index by calculating the evaluation index from the image focused on the imaging area that corresponds to the candidates for the number of foldings M and N, and has calculated the estimated values $M_0$ and $N_0$ of the number of foldings from the generated distribution of the evaluation index. Also, in step ST2a, the determination result has been obtained that the value of the evaluation index, where the estimated values of the number of foldings are $M_0$ and $N_0$, exceeds the threshold value $T_1$.

The ghost image determination unit 11 determines a pixel including a ghost image in the radar image focused on the imaging area that corresponds to the estimated values $M_0$ and $N_0$ of the number of foldings (step ST1c).

For example, the ghost image determination unit 11 determines for each pixel whether all of the first to fourth conditions described above are satisfied, and determines a pixel that satisfies the four conditions as a pixel that includes a formed ghost image.

Next, the ghost image determination unit 11 removes the noise from the pixel that is determined to include a ghost image (step ST2c). Pixel noise includes noise included in a reflection wave or noise caused by an error in the numerical calculation of the pixel value. The ghost image determination unit 11 specifies the pixel noise on the basis of the distribution of pixels determined to include a ghost image, and changes the determination for the specified pixel to that the pixel does not include the ghost image. For example, the ghost image determination unit 11 regards a pixel, which is distributed solely isolated among pixels determined to include a ghost image and has no other pixels determined to include the ghost image in adjacent positions, as noise. The process for determining an isolated pixel includes a process using a morphological expansion and contraction operation or a process using a median filter, and the ghost image determination unit 11 changes the determination so that the isolated pixel is not included in the ghost image.

As described above, the radar image processing device 1 according to the first embodiment performs determination of a pixel including a ghost image and changes the value of the pixel which is determined to include the ghost image on a radar image the focus of which has been changed. As a result, the radar image processing device 1 can suppress only ghost images in the radar image. In particular, the radar image processing device 1 can detect even a ghost image with low signal power on a radar image focused on the original imaging area, and can suppress only the detected ghost image. Since only the signal of the ghost image is processed, it is not necessary for the radar image to include a true image (an image of an observation target object), and the ghost image suppression unit 12 can suppress a ghost image included in an image without the true image.

In the radar image processing device 1 according to the first embodiment, the refocusing unit 10 converts the signal of the radar image from the time domain to the Doppler frequency domain, and changes the focus of the radar image so that the phase correction amount of the signal in the Doppler frequency domain does not contain a component proportional in the Doppler frequency direction. As a result, the refocusing unit 10 can obtain a radar image that forms an image within the imaging area that corresponds to the candidates for the number of foldings M and N.

The radar image processing device 1 according to the first embodiment includes the normalization unit 13 that normalizes the pixel amplitude in a radar image. Since the normalization unit 13 normalizes the pixel amplitude, the degree of formation of a ghost image when the focus is changed can be confirmed without being affected by the amplitude distribution of pixels on the radar image.

The radar image processing device 1 according to the first embodiment includes the moving average unit 14 for generating an image in which pixels are applied with a moving average that is obtained by subtracting values and subtracting phases of pixels that are separated by a certain distance in each pixel included in the radar image. The moving average unit 14 can reduce the noise included in the radar image by applying the moving average on the pixels, and can reduce the influence of interference among signals, speckles, and numerical calculation errors in signal processing.

Moreover, the estimation unit 15 estimates the number of foldings that can reduce the blur of the ghost image on the basis of the image generated by the moving average unit 14. The refocusing unit 10 changes the focus using the number of foldings estimated by the estimation unit 15. The ghost image determination unit 11 determines a pixel including the ghost image from the radar image the focus of which has been changed by the refocusing unit 10. Since the estimation unit 15 estimates the number of foldings before the determination by the ghost image determination unit 11, the ghost image determination unit 11 can reliably determine a pixel including a ghost image in a state where the number of foldings is confirmed. Furthermore, the estimation unit 15 calculates multiple evaluation indexes on the basis of images focused on imaging areas that correspond to the multiple candidates for the number of foldings, and obtains an estimated value of the number of foldings from the multiple evaluation indexes. The ghost image determination unit 11 determines a pixel including a ghost image from the image focused on the imaging area that corresponds to the estimated value of the number of foldings. As a result, the ghost image suppression unit 12 can suppress the ghost image even in a case where the object that gives the ghost image covers a wide area and multiple candidates for the number of foldings are obtained.

In the radar image processing device 1 according to the first embodiment, the refocusing unit 10 changes the focus of the radar image to multiple focuses. The ghost image determination unit 11 determines a pixel including a ghost image on the basis of a change in the values of pixels in radar images that are changed to have each of multiple focuses.

For example, the refocusing unit 10 generates an image focused on an imaging area that corresponds to each of multiple candidates for the number of foldings M and N. The ghost image determination unit 11 determines a pixel including a ghost image from an image in which the ghost image is formed, using a change in the pixel value in these images as an evaluation index. As a result, the ghost image determination unit 11 can accurately determine the pixel including the ghost image.

In the radar image processing device 1 according to the first embodiment, the refocusing unit 10 changes the focus of the radar image to multiple focuses. The ghost image determination unit 11 specifies information related to a focus that reduces the blur of the ghost image on the basis of a change in a pixel value in radar images that are changed to have each of multiple focuses and determines a pixel including the ghost image from the radar image in which the blur of the ghost image is reduced on the basis of the specified information related to the focus.

For example, the refocusing unit 10 generates an image focused on an imaging area that corresponds to each of multiple candidates for the number of foldings M and N. The ghost image determination unit 11 specifies the estimated values $M_0$ and $N_0$ of the number of foldings that are determined on the basis of these images as the information related to the focus that reduces the blur of the ghost image. The ghost image determination unit 11 determines a pixel including the ghost image from the radar image in which the blur of the ghost image is reduced on the basis of the information regarding the specified focus. As a result, the ghost image determination unit 11 can accurately determine the pixel including the ghost image.

In the radar image processing device 1 according to the first embodiment, the ghost image determination unit 11 determines a radar image including the ghost image on the basis of autocorrelation of the radar image among the radar images the focus of which has been changed by the refocusing unit 10. As a result, the ghost image determination unit 11 can accurately determine the pixel including the ghost image.

The radar image processing device 1 according to the first embodiment includes the repetition determination unit 16 that determines the end of repetition of the refocusing process, the ghost image determining process, and the ghost image suppressing process. As a result, the ghost image suppression unit 12 can suppress the ghost image until the upper limit value $T_4$ of the number of repetitions is reached.

In the radar image processing device 1 according to the first embodiment, the ghost image determination unit 11 specifies the pixel noise on the basis of the distribution of pixels determined to include a ghost image, and changes the determination for the specified pixel to that the pixel does not include the ghost image. As a result, the noise can be removed from the pixel that is determined to include the ghost image.

Second Embodiment

A radar image processing device according to a second embodiment enables check and correction of a processing result.

Figure 8:
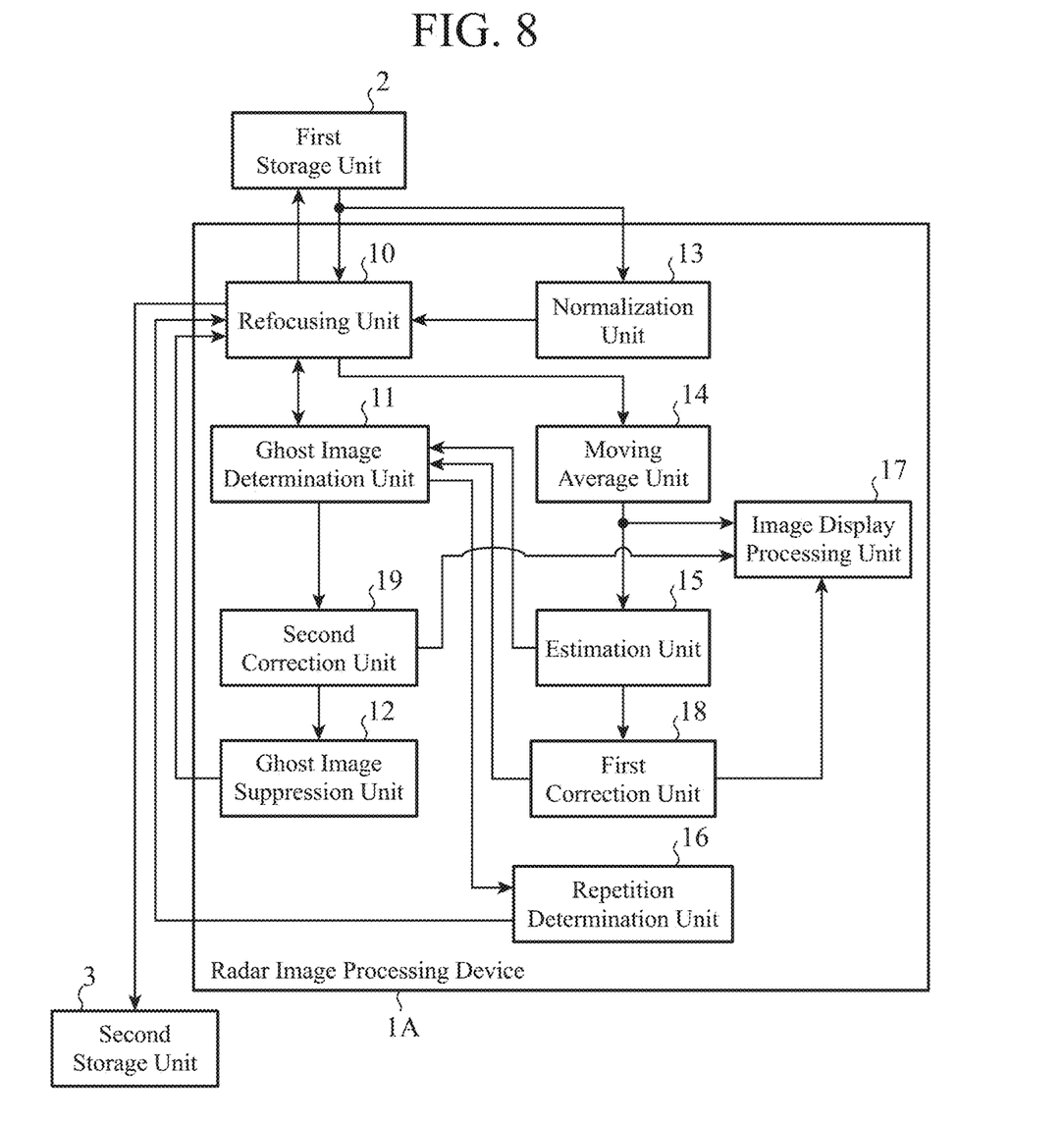
FIG. 8 is a block diagram illustrating a configuration of a radar image processing device according to a second embodiment of the invention.

FIG. 8 is a block diagram illustrating the configuration of a radar image processing device 1A according to the second embodiment of the invention. In FIG. 8, the same component as that described in FIG. 1 is denoted with the same symbol and description thereof is omitted. The radar image processing device 1A performs a process of suppressing a ghost image in a radar image stored in a first storage unit 2, and stores the radar image in which the ghost image is suppressed in a second storage unit 3. In the example illustrated in FIG. 8, the radar image processing device 1A includes a refocusing unit 10, a ghost image determination unit 11, a ghost image suppression unit 12, a normalization unit 13, a moving average unit 14, an estimation unit 15, a repetition determination unit 16, an image display processing unit 17, a first correction unit 18, and a second correction unit 19.

The image display processing unit 17 displays an image generated by the moving average unit 14 on a display device (not illustrated). A user of the radar image processing device 1A can visually recognize the image displayed on the display device.

The first correction unit 18 accepts correction operation on information regarding the focus that is specified by the ghost image determination unit 11, and corrects the information regarding the focus that reduces the blur of a ghost image on the basis of the accepted correction operation. The ghost image determination unit 11 determines a pixel including the ghost image from the radar image in which the blur of the ghost image is reduced on the basis of the information related to the focus that is corrected by the first correction unit 18.

The second correction unit 19 accepts correction operation for the determination result of the pixel including the ghost image, and corrects the determination result of the pixel including the ghost image on the basis of the accepted correction operation. The ghost image suppression unit 12 suppresses the ghost image by changing the value of the pixel determined to include the ghost image in the determination result corrected by the second correction unit 19.

Next, the operation will be described.

Figure 9:
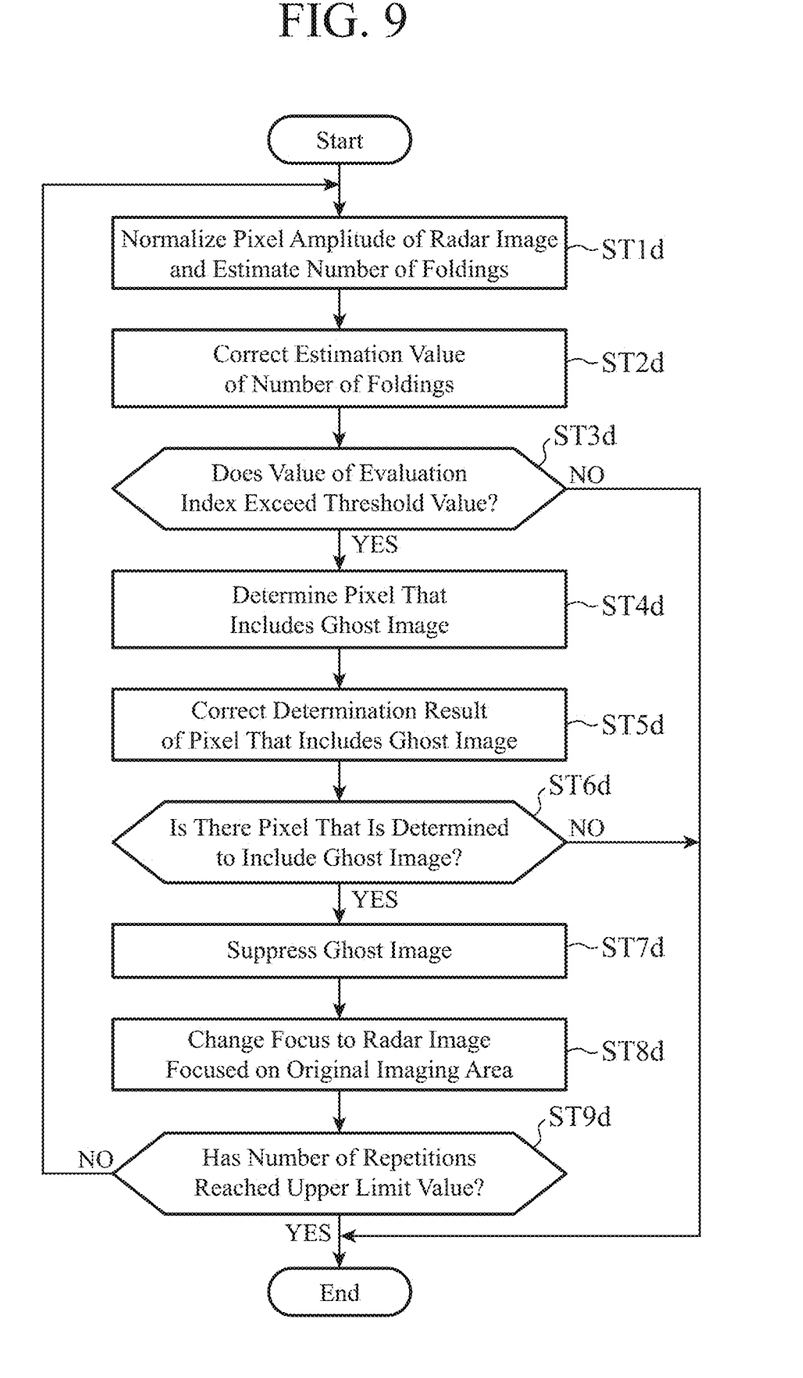
FIG. 9 is a flowchart illustrating details of a radar image processing method according to the second embodiment.

FIG. 9 is a flowchart illustrating details of a radar image processing method according to the second embodiment. The process of step ST1*d* in FIG. 9 is the same as that of step ST1*a* in FIG. 4, and the processes of step ST3*d* and step ST4*d* in FIG. 9 are the same as those of step ST2*a* and step ST3*a* in FIG. 4. The processes of steps ST6*d* to ST9*d* in FIG. 9 are the same as those of steps ST4*a* to ST7*a* in FIG. 4. Description of these processes is omitted.

In step ST2*d*, the first correction unit 18 corrects the estimated values $M_0$ and $N_0$ of the number of foldings input from the estimation unit 15. For example, the first correction unit 18 instructs the image display processing unit 17 to cause the display device to display the estimated values $M_0$ and $N_0$ of the number of foldings, the evaluation index where the estimated values of the number of foldings are $M_0$ and $N_0$, and the radar image with a focus that corresponds to the estimated values $M_0$ and $N_0$ of the number of foldings. Then the first correction unit 18 accepts correction operation using the input device (not illustrated) for the information displayed on the display device, and corrects the information displayed on the display device on the basis of the accepted correction operation. The estimated values $M_0$ and $N_0$ corrected in the above manner are output from the first correction unit 18 to the ghost image determination unit 11.

In step ST5*d*, the second correction unit 19 corrects the determination result of the pixel including the ghost image by the ghost image determination unit 11. For example, the second correction unit 19 instructs the image display processing unit 17 to cause the display device to display the estimated values $M_0$ and $N_0$ of the number of foldings and the position information of the pixel determined to include the ghost image. Then the second correction unit 19 accepts correction operation using the input device (not illustrated) for the information displayed on the display device, and corrects the information displayed on the display device on the basis of the accepted correction operation. The determination result corrected in this manner is output from the second correction unit 19 to the ghost image suppression unit 12. The ghost image suppression unit 12 suppresses the ghost image by changing the value of the pixel determined to include the ghost image in the determination result corrected by the second correction unit 19.

As described above, in the radar image processing device 1A according to the second embodiment, the ghost image determination unit 11 determines a pixel including the ghost image from the radar image in which the blur of the ghost image is reduced on the basis of the information related to the focus that is corrected by the first correction unit 18. As a result, even in a case where the radar image processing device 1A erroneously generates information related to the focus that reduces the blur of a ghost image, the first correction unit 18 can appropriately correct the erroneous information.

In the radar image processing device 1A according to the second embodiment, the ghost image suppression unit 12 suppresses the ghost image by changing the value of the pixel that is determined to include the ghost image in the determination result corrected by the second correction unit 19. As a result, even when the radar image processing device 1A erroneously determines a pixel including the ghost image, the second correction unit 19 can appropriately correct the erroneous determination result.

Third Embodiment

The functions of the refocusing unit 10, the ghost image determination unit 11, the ghost image suppression unit 12, the normalization unit 13, the moving average unit 14, the estimation unit 15, and the repetition determination unit 16 in the radar image processing device 1 are each implemented by a processing circuit. That is, the radar image processing device 1 includes a processing circuit for executing the processes from step ST1*a* to step ST7*a* illustrated in FIG. 4. Similarly, the functions of the refocusing unit 10, the ghost image determination unit 11, the ghost image suppression unit 12, the normalization unit 13, the moving average unit 14, the estimation unit 15, the repetition determination unit 16, the image display processing unit 17, the first correction unit 18, and the second correction unit 19 in the radar image processing device 1A are implemented by a processing circuit. These processing circuits may be dedicated hardware or a central processing unit (CPU) for executing a program stored in a memory.

Figure 10A:
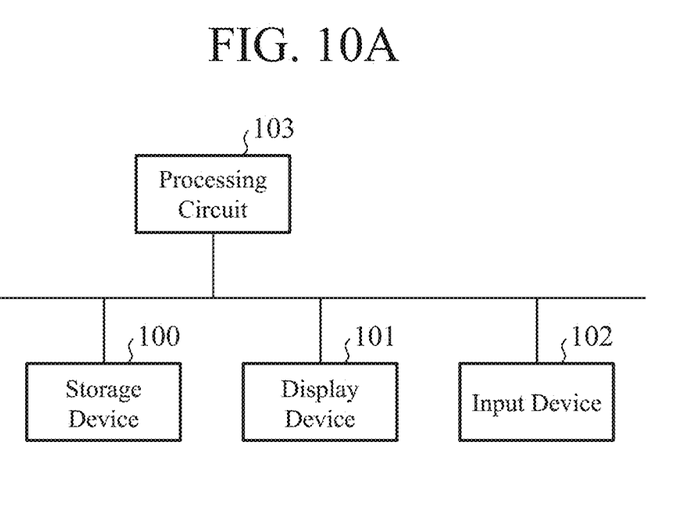
FIG. 10A is a block diagram illustrating a hardware configuration for implementing the functions of the radar image processing device according to the first embodiment or the second embodiment.
Figure 10B:
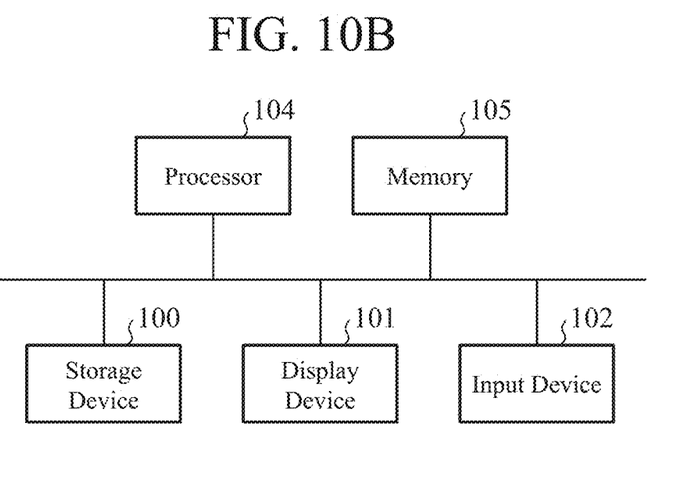
FIG. 10B is a block diagram illustrating a hardware configuration for executing software that implements functions of the radar image processing device according to the first embodiment or the second embodiment.

FIG. 10A is a block diagram illustrating a hardware configuration for implementing the functions of the radar image processing device 1 or the radar image processing device 1A. FIG. 10B is a block diagram illustrating a hardware configuration for executing software that implements the functions of the radar image processing device 1 or the radar image processing device 1A. The storage device 100 illustrated in FIG. 10A and FIG. 10B functions as the first storage unit 2 and the second storage unit 3. Note that the storage device 100 may be included in the radar image processing device 1 or the radar image processing device 1A, or may be included in a device separate from the radar image processing devices. For example, the storage device 100 may be a device on a communication network that can be accessed for communication from the radar image processing device 1 or the radar image processing device 1A.

A display device 101 displays image information that is input from the image display processing unit 17 under the control of the image display processing unit 17. An input device 102 is a device that accepts operation input from a user, and is implemented by a touch panel, hardware keys, a mouse, or the like. The first correction unit 18 corrects information regarding the focus at which the blur of a ghost image is reduced on the basis of correction operation using the input device 102. In addition, the second correction unit 19 corrects a determination result of a pixel including a ghost image on the basis of correction operation using the input device 102.

In a case where the processing circuit is a processing circuit 103 of dedicated hardware illustrated in FIG. 10A, the processing circuit 103 may be a single circuit, a composite circuit, a programmed processor, a parallel programmed processor, an application specific integrated circuit (ASIC), a field-programmable gate array (FPGA), or a combination thereof, for example.

The functions of the refocusing unit 10, the ghost image determination unit 11, the ghost image suppression unit 12, the normalization unit 13, the moving average unit 14, the estimation unit 15, and the repetition determination unit 16 in the radar image processing device 1 may be each implemented by separate processing circuits, or may be collectively implemented by a single processing circuit. The functions of the refocusing unit 10, the ghost image determination unit 11, the ghost image suppression unit 12, the normalization unit 13, the moving average unit 14, the estimation unit 15, the repetition determination unit 16, the image display processing unit 17, the first correction unit 18, and the second correction unit 19 in the radar image processing device 1A may be each implemented by separate processing circuits, or may be collectively implemented by a single processing circuit.

In the case where the processing circuit is a processor 104 illustrated in FIG. 10B, the respective functions of the refocusing unit 10, the ghost image determination unit 11, the ghost image suppression unit 12, the normalization unit 13, the moving average unit 14, the estimation unit 15, and the repetition determination unit 16 in the radar image processing device 1 are implemented by software, firmware, or a combination of software and firmware.

Similarly, the respective functions of the refocusing unit 10, the ghost image determination unit 11, the ghost image suppression unit 12, the normalization unit 13, the moving average unit 14, the estimation unit 15, the repetition determination unit 16, the image display processing unit 17, the first correction unit 18, and the second correction unit 19 in the radar image processing device 1A are implemented by software, firmware, or a combination of software and firmware. Note that the software or the firmware is described as a program and is stored in a memory 105.

The processor 104 implements each function of the refocusing unit 10, the ghost image determination unit 11, the ghost image suppression unit 12, the normalization unit 13, the moving average unit 14, the estimation unit 15, and the repetition determination unit 16 in the radar image processing device 1 by reading and executing a program stored in the memory 105. That is, the radar image processing device 1 includes the memory 105 for storing programs execution of which by the processor 104 results in execution of the processes from step ST1a to step ST7a illustrated in FIG. 4.

These programs cause a computer to execute the procedures or methods of the refocusing unit 10, the ghost image determination unit 11, the ghost image suppression unit 12, the normalization unit 13, the moving average unit 14, the estimation unit 15, and the repetition determination unit 16. The memory 105 may be a computer-readable storage medium storing the programs for causing a computer to function as the refocusing unit 10, the ghost image determination unit 11, the ghost image suppression unit 12, the normalization unit 13, the moving average unit 14, the estimation unit 15, and the repetition determination unit 16. The above similarly applies to the radar image processing device 1A.

The memory 105 corresponds to a nonvolatile or volatile semiconductor memory such as a random access memory (RAM), a read only memory (ROM), a flash memory, an erasable programmable read only memory (EPROM), or an electrically-EPROM (EEPROM); a magnetic disc, a flexible disc, an optical disc, a compact disc, a mini disc, or a DVD.

A part of the functions of the refocusing unit 10, the ghost image determination unit 11, the ghost image suppression unit 12, the normalization unit 13, the moving average unit 14, the estimation unit 15, and the repetition determination unit 16 may be implemented by dedicated hardware with another part thereof implemented by software or firmware.

For example, the refocusing unit 10, the ghost image determination unit 11, and the ghost image suppression unit 12 implement the functions thereof by a processing circuit as dedicated hardware. The functions of the normalization unit 13, the moving average unit 14, the estimation unit 15, and the repetition determination unit 16 may be implemented by the processor 104 reading and executing programs stored in the memory 105.

This similarly applies to the refocusing unit 10, the ghost image determination unit 11, the ghost image suppression unit 12, the normalization unit 13, the moving average unit 14, the estimation unit 15, the repetition determination unit 16, the image display processing unit 17, the first correction unit 18, and the second correction unit 19 in the radar image processing device 1A.

In this manner, the processing circuit can implement each function described above by hardware, software, firmware, or a combination thereof.

Note that the present invention is not limited to the above embodiments, and the present invention may include a flexible combination of the individual embodiments, a modification of any component of the individual embodiments, or omission of any component in the individual embodiments within the scope of the present invention.

INDUSTRIAL APPLICABILITY

A radar image processing device according to the present invention can suppress only ghost images in a radar image, and thus is applicable to SARs.

REFERENCE SIGNS LIST 1, 1A: radar image processing device, 2: first storage unit, 3: second storage unit, 10: refocusing unit, 11: ghost image determination unit, 12: ghost image suppression unit, 13: normalization unit, 14: moving average unit, 15: estimation unit, 16: repetition determination unit, 17: image display processing unit, 18: first correction unit, 19: second correction unit, 20A, 20B: radar image, 30a, 30b: image, 40: ghost image, 100: storage device, 101: display device, 102: input device, 103: processing circuit, 104: processor, 105: memory.

The invention claimed is:

1. A radar image processing device comprising:
processing circuitry to perform a process of:
inputting a radar image and changing a focus of the radar image;
determining a pixel including a ghost image from the radar image the focus of which has been changed by;
changing a value of the pixel that has been determined to include the ghost image on the radar image the focus of which has been changed; and
normalizing a pixel amplitude in the radar image,
wherein the process determines an image including a ghost image from radar images, the amplitude of a pixel of which is normalized and the focus of which is changed.

2. The radar image processing device according to claim 1,
wherein the process converts a signal of the radar image from a time domain to a Doppler frequency domain, and changes the focus of the radar image so that a phase correction amount of the signal in the Doppler frequency domain does not contain a component proportional in a Doppler frequency direction.

3. The radar image processing device according to claim 2,
wherein the process changes the focus of the radar image to multiple focuses, and the process determines the pixel including the ghost image on a basis of a change in a pixel value in radar images that are changed to have the respective multiple focuses.

4. The radar image processing device according to claim 1,
wherein the process changes the focus of the radar image to multiple focuses, and
the process specifies information related to a focus that reduces blur of the ghost image on a basis of a change in a pixel value in radar images that are changed to have the respective multiple focuses and determines the pixel including the ghost image on a basis of the specified information related to the focus.

5. The radar image processing device according to claim 4,
wherein the process determines a radar image including the ghost image on a basis of autocorrelation of the radar image among the radar images the focus of which has been changed.

6. The radar image processing device according to claim 4, further comprising:
determining an end of repetition of a refocusing process, a ghost image determining process, and a ghost image suppressing process.

7. The radar image processing device according to claim 4, further comprising:
accepting correction operation of the information related to the focus specified and correcting the information related to the focus that reduces the blur of the ghost image on a basis of the accepted correction operation,
wherein the process determines the pixel including the ghost image from a radar image in which the blur of the ghost image is reduced on a basis of the information related to the focus corrected.

8. The radar image processing device according to claim 1, the process further comprising:
accepting correction operation of a determination result of the pixel including the ghost image and correcting the determination result of the pixel including the ghost image on a basis of the accepted correction operation,
wherein the process suppresses the ghost image by changing a value of the pixel determined to include the ghost image in the determination result corrected.

9. The radar image processing device according to claim 1,
wherein the process specifies pixel noise on a basis of a distribution of pixels determined to include a ghost image, and changes determination for the specified pixel to that the pixel does not include the ghost image.

10. A radar image processing device comprising:
processing circuitry to perform a process of:
inputting a radar image and changing a focus of the radar image;
determining a pixel including a ghost image from the radar image the focus of which has been changed; and
changing a value of the pixel that has been determined to include the ghost image on the radar image the focus of which has been changed,
wherein the process converts a signal of the radar image from a time domain to a Doppler frequency domain, and changes the focus of the radar image so that a phase correction amount of the signal in the Doppler frequency domain does not contain a component proportional in a Doppler frequency direction.

11. The radar image processing device according to claim 10,
wherein the process changes the focus of the radar image to multiple focuses, and
the process determines the pixel including the ghost image on a basis of a change in a pixel value in radar images that are changed to have the respective multiple focuses.

12. A radar image processing device comprising:
processing circuitry to perform a process of;
inputting a radar image and changing a focus of the radar image;
determining a pixel including a ghost image from the radar image the focus of which has been changed; and
changing a value of the pixel that has been determined to include the ghost image on the radar image the focus of which has been changed,
wherein the process changes the focus of the radar image to multiple focuses, and
the process specifies information related to a focus that reduces blur of the ghost image on a basis of a change in a pixel value in radar images that are changed to have the respective multiple focuses and determines the pixel including the ghost image on a basis of the specified information related to the focus.

13. A radar image processing method comprising:
inputting a radar image and changing a focus of the radar image;
determining a pixel including a ghost image from the radar image the focus of which has been changed; and
changing a value of the pixel that has been determined to include the ghost image on the radar image the focus of which has been changed,
converting a signal of the radar image from a time domain to a Doppler frequency domain, and changing the focus of the radar image so that a phase correction amount of the signal in the Doppler frequency domain does not contain a component proportional in a Doppler frequency direction.

* * * * *